Oct. 3, 1933. A. E. JONES 1,928,788
MANUFACTURE OF SHOWER BATH RECEPTORS
Filed Nov. 16, 1931
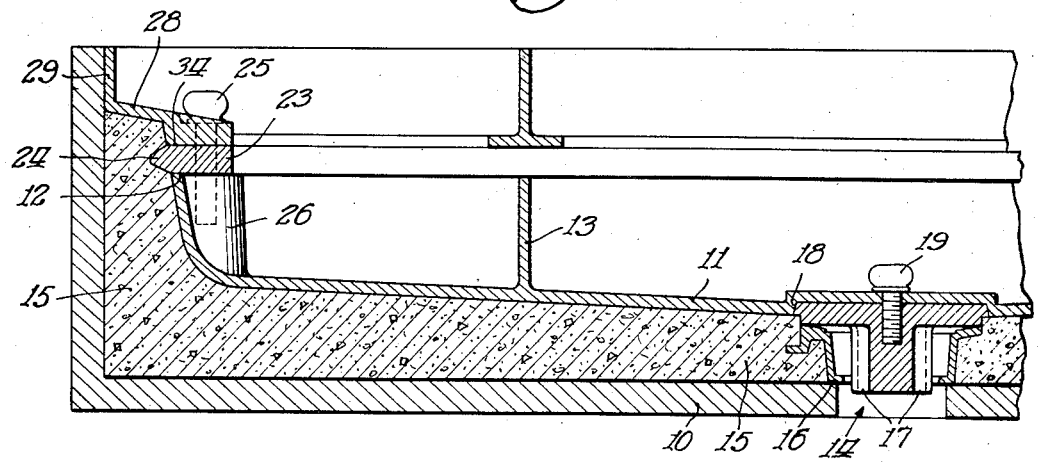
Fig. 1
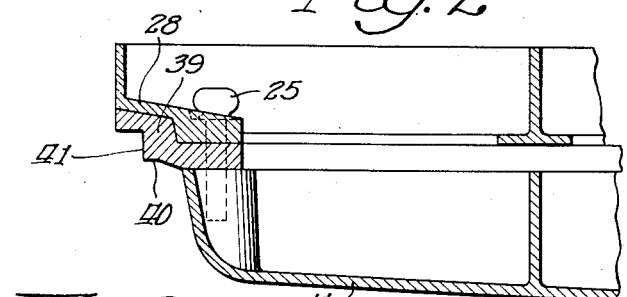
Fig. 2
Fig. 4
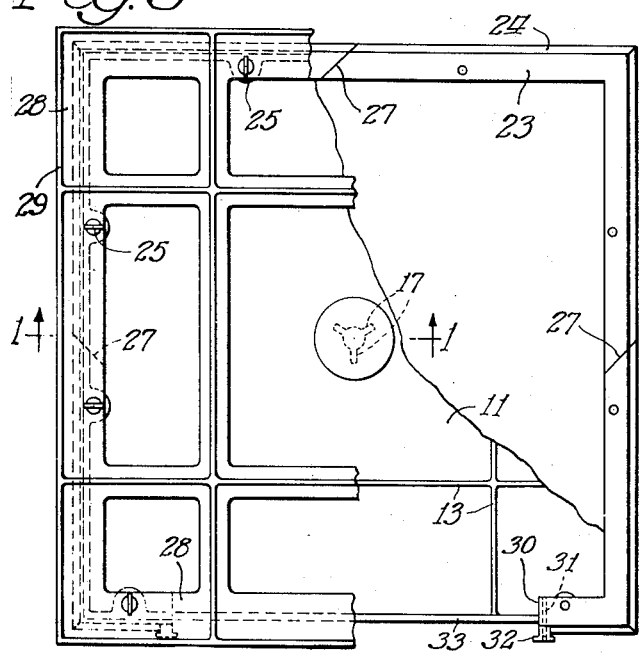
Fig. 3
Fig. 5
Inventor
Arthur E. Jones
By Roland C. Rehm
Atty Patented Oct. 3, 1933

1,928,788

UNITED STATES PATENT OFFICE 1,928,788

MANUFACTURE OF SHOWER BATH RECEPTORS

Arthur E. Jones, Elkhart, Ind., assignor to Henry Weis Manufacturing Company, Inc., Elkhart, Ind., a corporation of Indiana Application November 16, 1931
Serial No. 575,344

7 Claims. (Cl. 25—129)

This invention relates to shower cabinet receptors, and among other objects aims to facilitate the manufacture of molded receptors.

The nature of the invention may be readily understood by reference to an embodiment thereof illustrated in the accompanying drawing.

In said drawing:

Fig. 1 is a transverse section of a receptor mold arranged for molding a receptor designed to receive a sheet metal cabinet;

Fig. 2 is a section similar to that of Fig. 1 showing the mold arranged for molding a receptor designed to receive thick slab material forming the walls of the shower cabinet;

Fig. 3 is a top plan view of the receptor mold shown in Fig. 1, certain parts having been broken away to expose subjacent parts;

Fig. 4 is a fragmentary transverse section of a receptor molded from the mold as arranged in Fig. 1, and showing the lower portion of sheet metal cabinet walls seated thereon; and Fig. 5 is a section similar to that of Fig. 4 showing a receptor formed from the mold as arranged in Fig. 2, and having cabinet walls of thick slab material seated thereon.

The construction of shower baths according to present day practices requires the fabrication of accurately formed receptors upon which the side walls of the cabinet rest. The latter are generally pre-formed and in order to make possible a leak-proof joint between the cabinet walls and the receptor, the latter must accurately conform to the cabinet wall dimensions.

Accurately dimensioned receptors may advantageously be made by molding them from some appropriate cementitious material such as terrazzo, in molds which will faithfully form the receptor to the required dimensions. To insure accurate reproduction of a large quantity of identical receptors, the molds should preferably be made of metal. Aluminum is desirable because its lightness renders more easy the handling of the bulky parts of the mold or pattern, yet the expense of an intricate aluminum mold is hardly warranted unless its design promotes efficiency and contributes to low cost of production.

In the drawing is illustrated an aluminum receptor mold or pattern designed to be convertible so that the same apparatus may be employed for molding receptors of two types, one for receiving sheet metal cabinet walls and the other for receiving cabinet walls of thick slab material such as marble. The mold comprises the outer mold box 10 which forms the outer surfaces of the bottom and sides of the receptor. It may be used for forming both types of receptors. The inner surfaces of the receptor are formed by an aluminum pattern 11 whose molding surface is preferably quite smooth or polished and whose sides terminate at 12 short of the top of the mold. Reinforcing ribs 13 integral with the pattern extend from side to side thereof to increase the rigidity and strength of the pattern. The drain opening 14 at the bottom of the receptor 15 is formed by a metal insert 16 centered in the mold by radial wings 17 on a removable plug which is, itself, centered by an inwardly offset recess 18 in the pattern bottom and removably held therein by thumb-screw 19.

The groove 20 in the receptor sides for receiving the re-entrant flange 21 of the cabinet molds 22 is formed by a removable metal strip 23 having an appropriately shaped edge 24 and removably held in position by thumb-screws 25 which enter threaded bosses 26 in the pattern 11. To facilitate stripping of the mold, the strip 23 is made in a plurality of sections whose ends are cut on the bias as shown at 27 to prevent leakage of the cementitious material on casting. The upper portion of the receptor side walls is finished by the removable top pattern section 28 held in position by the thumb-screws 25, and whose side flange 29 contacts with the inner face of the mold sides of the mold box 10. The section 28 has integral transversely extending reinforcing ribs.

As will be apparent from the foregoing, the mold may be stripped merely by removing the thumbscrews 25, then the top section 28 of the pattern, and then moving the several sections of the strip 23 inwardly until they clear the groove 20, whereupon they may be lifted away. Then the main portion of the pattern may be pulled out. It will be noted that the inclined sides of the pattern afford ample draft to permit its easy withdrawal from the casting.

As indicated in Fig. 3, the strip 23 terminates at 30 at spaced points along one side of the receptor corresponding to the entrance opening into the shower cabinet. The extremities of these strip sections are provided with outwardly directed pins 31 adapted to receive a brass or other non-corrodible insert 32 which is cast into the receptor to form an abutment at the end of the groove 20 (adjacent the door opening) against which the edge of the metal flange 21 may abut,— thereby protecting the cementitious material of the receptor itself from the cutting action of the metal and affording a permanent means of holding the flange 21 of the side walls seated in groove 20. In withdrawing the sections of the strip 23 from the mold, the sections carrying the pins 31 may be moved back (after the other sections have been removed) until the pins clear the inserts.

Between the points 30, the top edge 33 of pattern 11 extends upwardly into contact with the lower edge 34 of the top section 28, thus making a smooth, unbroken inner face to the receptor side directly below the entrance opening.

The above pattern is constructed and arranged to permit its use in molding a receptor 35 designed to receive cabinet side walls of thick slab material 36. Such a receptor is characterized by an interior seat 37 of a width corresponding to the thickness of the slab material 36 downwardly offset from the upper portion 38 of the receptor sides. The aforesaid configuration is given to the mold by the insert 39 in the form of an open frame extending around the top of the pattern 11 (except at the entrance opening) and connected thereto by the thumb-screws 25. The molding face of the insert is shaped at 40 and 41 to form the downwardly offset seat 37 of the cabinet sides. The upper face of the insert is shaped to receive the top section 28 of the mold. The pattern section 39 terminates at each side of the entrance opening into the shower cabinet, and the upper edge 33 of pattern 11 extends upwardly between the ends of section 39 into engagement with the lower face 34 of the top section 28.

Thus the mold may be converted to form receptors for the two types of cabinet side walls now generally in use, i. e., the sheet metal and the thick slab side walls.

In molding a terrazzo receptor, the inner face of the receptor may advantageously be polished after molding in order to bring out the beauty of the material.

Obviously the invention is not limited to the details of the illustrated construction since these may be variously modified. Moreover, it is not indispensable that all features of the invention be used conjointly since various features may be used to advantage in different combinations and subcombinations.

Having described my invention, I claim:

1. In shower bath construction, a mold for making shower cabinet receptors having a seat for receiving cabinet side walls, comprising in combination a pattern for forming the inside face of the receptor bottom and side walls, and a separable strip removably carried by said pattern for forming a groove on the inner face of said side walls, said strip having means at its ends for releasably carrying metal inserts to be cast into said receptor at the ends of said groove.

2. In shower bath construction, a mold for making shower cabinet receptors having a seat for receiving cabinet side walls, comprising in combination a pattern for forming the inside face of the receptor bottom and curving upwardly to form the inner surface of the receptor side walls, said upwardly curving portions carrying threaded bosses, and a removable pattern section shaped to provide the proper contour for the top portion of said side walls removably connected to said pattern by screws entering said bosses.

3. In shower bath construction, a mold for making shower cabinet receptors having a seat for receiving cabinet side walls, comprising in combination a pattern for forming the inside face of the receptor bottom and curving upwardly to form the inner surface of the receptor side walls, said upwardly curving portions carrying threaded bosses, a removable pattern section shaped to provide the proper contour for the top portion of said side walls removably connected to said pattern by screws entering said bosses, and an outer mold box surrounding said pattern, the top of said pattern section extending over into engagement with said box to close the mold.

4. In shower bath construction, a mold for making shower cabinet receptors having a seat for receiving cabinet side walls, comprising in combination a pattern for forming the inside face of the receptor bottom and the side walls to a point adjacent said seat, the upper edge of said pattern being formed to receive a pattern section, alternate pattern sections for forming a seat for sheet metal cabinet walls or a seat for thick slab side walls, and a mold box surrounding said pattern, said alternate sections being each designed to form the top of the receptor side walls and engaging the sides of the mold box to enclose the mold.

5. In shower bath construction, a mold for making shower cabinet receptors having a seat for receiving cabinet side walls, comprising in combination a pattern for forming the inside face of the receptor bottom and the side walls to a point adjacent said seat, a removable pattern section formed to provide the desired shape of seat adapted to be applied to the upper edge of said pattern, said section having laterally movable mold strips to form a groove in the side walls of the receptor adjacent the seat, said strips being movable inwardly to permit their removal from the cast receptor, and means for removably connecting said section to the pattern.

6. The method of forming a cementitious shower cabinet receptor having an internal groove along the sides thereof terminated by metal abutments, which is characterized by placing cementitious material in a mold and forming the groove therein by a removable strip; and releasably supporting on the strip, metal inserts to be cast into said receptor, whereby when said strip is removed the inserts remain cast in position in said receptor.

7. In shower bath construction, a mold for making shower cabinet receptors having a seat for receiving cabinet side walls, comprising in combination a pattern for forming the inside face of the receptor bottom and side walls, and a strip carried by said pattern for forming the groove in the inner face of the side walls, said strip having means for releasably supporting inserts to be cast into the receptor and adapted to release the inserts when the pattern is stripped from the casting.

ARTHUR E. JONES.